United States Patent [19]
Jesse, Jr. et al.

[11] Patent Number: 5,359,963
[45] Date of Patent: Nov. 1, 1994

[54] DOG SWEATER

[76] Inventors: Ronald C. Jesse, Jr.; Darlene L. Jesse, both of 1314 Moonlite Dr., Eagle River, Wis. 54521

[21] Appl. No.: 162,238
[22] Filed: Dec. 6, 1993
[51] Int. Cl.⁵ ............................................ A01K 29/00
[52] U.S. Cl. ................................... 119/850; 119/861; 54/80.1; 54/79.1
[58] Field of Search ................ 119/850, 856, 861; 2/1, 2-5; 54/80.1, 79.1, 79.2, 79.3, 79.4

[56] References Cited
U.S. PATENT DOCUMENTS

| | | | |
|---|---|---|---|
| 2,131,495 | 9/1938 | Allen | 54/79.2 |
| 2,222,705 | 11/1940 | Lonlon | 119/850 |
| 3,742,679 | 7/1973 | Jordan | 119/850 |
| 3,814,061 | 6/1974 | Aries et al. | 119/861 |
| 4,355,600 | 10/1982 | Ziclinski | 119/850 |
| 4,744,333 | 5/1988 | Taylor | 119/850 |

*Primary Examiner*—John G. Weiss
*Attorney, Agent, or Firm*—Michael J. Colitz, Jr.

[57] ABSTRACT

A dog sweater comprising a fabric torso portion and a lower portion for covering the body of a dog in inclement weather. A first aperture extends through the front end of the fabric torso portion for accepting a dog's head. A neck collar for covering a dog's neck is positioned about and integral with the first aperture. A second opening extends through the posterior end of the fabric torso portion for enabling a dog to eliminate bodily waste without soiling the fabric torso portion. A pair of apertures at the front lower portion and a pair of apertures at the posterior lower portion of the fabric torso portion receive the fore and rear limbs of a dog, respectively. A sleeve is integral with and extends downwardly from each aperture at the lower portion of the torso portion. The sleeves have an upper end, a lower end and fabric extending between for protecting the upper portion of a dog's limbs. A leg collar is positioned about, and integral with, the bottom end of each sleeve. A legging having a top and bottom end, an exterior surface, and an interior surface is detachably coupled to the lower end of each leg sleeve for protecting the lower portion of the fore and rear legs of a dog from the elements.

4 Claims, 4 Drawing Sheets

DOG SWEATER

BACKGROUND OF THE INVENTION

1. Field of the Invention

The present invention relates to dog sweater and more particularly pertains to dog sweaters which may be used to protect a dog from inclement weather and fleas.

2. Description of the Prior Art

Prior to the domestication of canines, there was seldom any discussion of whether a dog's physiology, physique, fur and other physical characteristics were suitable for the environment which it inhabited. Natural selection made relatively quick work of canines that were unsuited for their surroundings. This natural selection ultimately resulted in the establishment of bloodlines for particular breeds. Bloodlines assured, among other things, that desirable genetic characteristics of the bloodline flourished, while other less desirable attributes became attenuated over time.

With the domestication of canines, the environmentally-specific physical attributes of a dog tended to become less important to the dog's survival and more central to a dog's attractiveness as a pet. Dogs were taken into the home and moved to new locales, and climes, with their roving owners.

A long-haired Arctic dog might find himself in Miami, while a Mexican Chihuahua might find himself captive in Antarctica.

It is to the plight of the particularly unfortunate latter specimen that the present invention is directed. The present invention makes it possible for this little creature to lead a relatively flea-free existence while enjoying the comforts of outdoor elimination in a natural environment without suffering the pangs of frostbite, wind, and rain.

The use of dog sweaters is known in the prior art. More specifically, dog sweaters heretofore devised and utilized for the purpose of protecting dogs from inclement weather are known to consist basically of familiar, expected and obvious structural configurations, notwithstanding the myriad of designs encompassed by the crowded prior art which have been developed for the fulfillment of countless objectives and requirements.

The present invention is directed to improving devices for protecting dogs from inclement conditions in a manner which is safe, secure, economical and aesthetically pleasing.

For example, U.S. Pat. No. 5,060,458 to Curtis discloses a sleeveless dog coat for use on dogs of considerable girth.

U.S. Pat. No. 4,355,600 to Zielinski describes a protective body suit for animals comprising a sleeveless tube of elastic fabric.

Another patent of interest is U.S. Pat. No. 4,527,991 to Msarsa disclosing a dog diaper.

Finally, U.S. Pat. No. 5,003,756 to Mazzaotta describes a sleeveless dog coat with flea repellent strips removably mounted in the sides.

U.S. Pat. No. 5,060,458 to Curtis discloses a sleeveless dog coat for use on dogs of considerable girth. A a-one size-fits-all approach of this sort offers no limb or flea repellent protection, and requires constant vigilance on the part of the pet owner to maintain an optimum fit and proper placement on a moving, growing dog.

U.S. Pat. No. 4,355,600 to Zielinski describes a protective body suit for animals comprising a sleeveless tube of elastic fabric. This invention does not address the issue of flea repellence or limb protection.

Another patent of interest is U.S. Pat. No. 4,527,991 to Msarsa disclosing a dog diaper. This invention deals more with the problem of incontinent dogs as opposed to the present invention.

U.S. Pat. No. 5,003,756 to Mazzaotta describes a sleeveless dog coat with flea repellent strips removably mounted in the sides. This invention does address the issue of flea repellence but not limb protection. The flea repellence is provided by strips mounted in the garment. There is no provision for scratch-activated repellent dispersal as found in the present invention.

In this respect, the dog sweater according to the present invention substantially departs from the conventional concepts and designs of the prior art, and in so doing provides an apparatus primarily developed for the purpose of protecting dogs from fleas and inclement weather.

Therefore, it can be appreciated that there exists a continuing need for new and improved dog sweater which can be worn by dogs. In this regard, the present invention substantially fulfills this need.

As illustrated by the background art, efforts are continuously being made in an attempt to clothe dogs. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of dog sweaters now present in the prior art, the present invention provides an improved dog sweater construction wherein the same can be utilized for keeping a dog safe from fleas and inclement weather. As such, the general purpose of the present invention, which will be described subsequently in greater detail, is to provide a new and improved dog sweater apparatus which has many of the advantages of the dog sweaters mentioned heretofore and many novel features that result in a dog sweater which is not anticipated, rendered obvious, suggested, or even implied by any of the prior art dog sweaters, either alone or in any combination thereof and which has none of the disadvantages of the prior art dog sweaters.

The invention is defined by the appended claims with the specific embodiment shown in the attached drawings. For the purpose of summarizing the invention, the invention may be incorporated into a new and improved dog sweater. The dog sweater comprises a fabric torso portion having an exterior surface, an interior surface, a front end, a posterior end, a top portion, and a lower portion for covering the body of a dog in inclement weather. A first aperture extends through the front end of the fabric torso portion for accepting a dog's head. A neck collar for covering a dog's neck is positioned about and integral with the first aperture. A second opening extends through the posterior end of the fabric torso portion for enabling a dog to eliminate bodily waste without soiling the fabric torso portion. A pair of apertures at the front lower portion and a pair of apertures at the posterior lower portion of the fabric torso portion receive the fore and rear limbs of a dog, respectively. A sleeve is integral with and extends downwardly from each aperture at the lower portion of the torso portion. The sleeves have an upper end, a lower end and fabric extending between for protecting the upper portion of a dog's limbs. A leg collar is positioned about, and integral with, the bottom end of each sleeve. A legging having a top and bottom end, an exterior surface, and an interior surface is detachably coupled to the lower end of each leg sleeve for protecting the lower portion of the fore and rear legs of a dog from the elements.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved dog sweater comprising a fabric torso portion having an exterior surface, and interior surface, a front end, a posterior end, a top portion, and a lower portion for covering the body of a dog in inclement weather; a first aperture extending through the front end of the fabric torso portion for accepting a dog's head; a neck collar for protecting a dog's neck positioned about, and integral with, the first aperture at the front portion of the fabric torso portion; a second opening extending through the posterior end of the fabric torso portion for enabling a dog to eliminate bodily waste without soiling the fabric torso portion; a pair of apertures each at the front and posterior lower portions of the fabric torso portion for receiving the fore and rear limbs of a dog, respectively; a sleeve integral with and extending downwardly from each aperture at the front and posterior lower portions of the fabric torso portion having an upper end, a lower end, and fabric extending therebetween for protecting the upper portions of the fore and rear limbs of a dog, respectively; a leg collar having a top end and a bottom end is positioned about, and integral with the bottom end of each sleeve at the front and posterior lower portion of the fabric torso portion for receiving leggings; a legging having a top and bottom end, an exterior surface, and an interior surface is detachably coupled at the bottom end of each leg collar for protecting the lower portion of the fore and rear legs of a dog from the elements.

It is a further object of the present invention to provide a new and improved dog sweater which is of a durable and reliable construction.

An even further object of the present invention is to provide a new and improved dog sweater which is susceptible of a low cost of manufacture with regard to both materials and labor, and which accordingly is then susceptible of low prices of sale to the consuming public, thereby making such dog sweaters economically available to the buying public.

Still yet another object of the present invention is to provide a new and improved dog sweater which provides in the apparatuses and methods of the prior art some of the advantages thereof, while simultaneously overcoming some of the disadvantages normally associated therewith.

Still another object of the present invention is to provide a new and improved dog sweater which releases flea repellent via scratch activation by a dog.

Yet another object of the present invention is to provide a new and improved dog sweater which protects all portions of a dog's limbs from the elements and from fleas.

Even still another object of the present invention is to provide a new and improved dog sweater which provides boots which a dog may wear without inconvenience.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
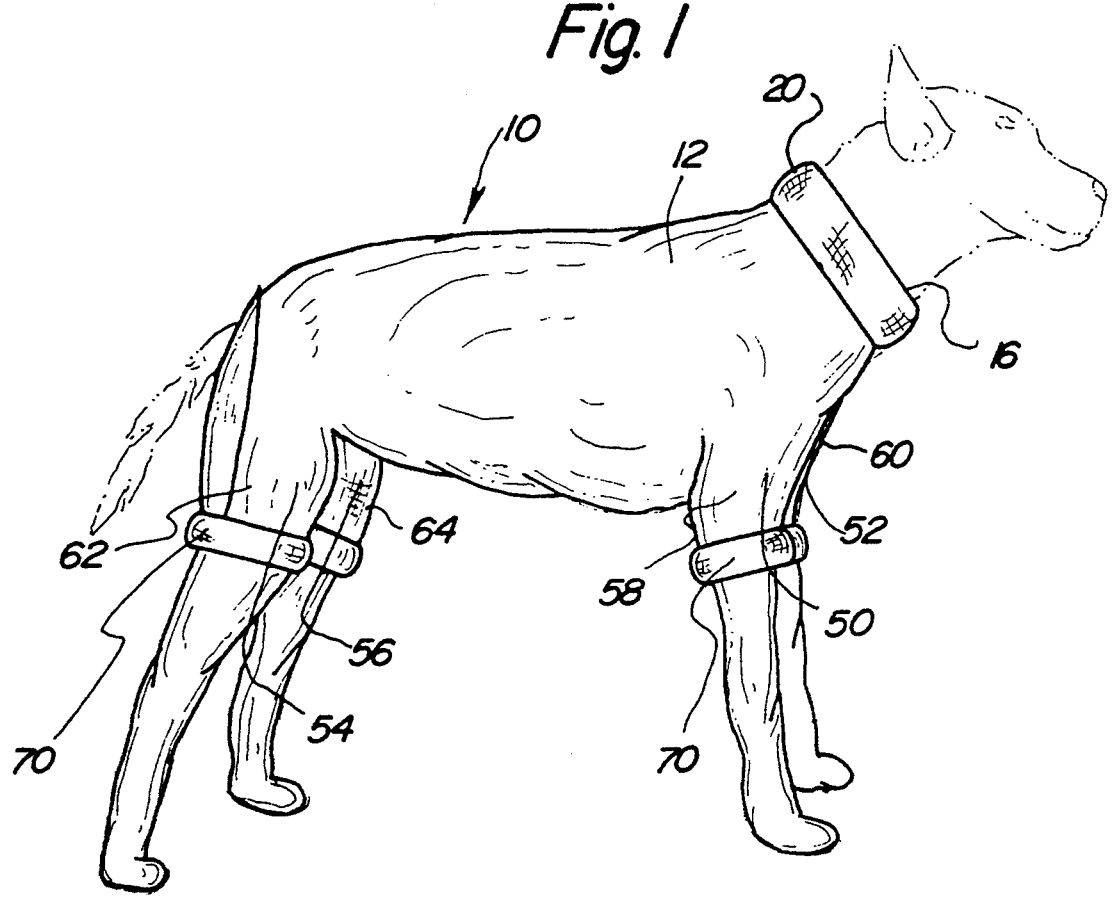
FIG. 1 is a perspective view showing a canine wearing the present invention.
Figure 2:
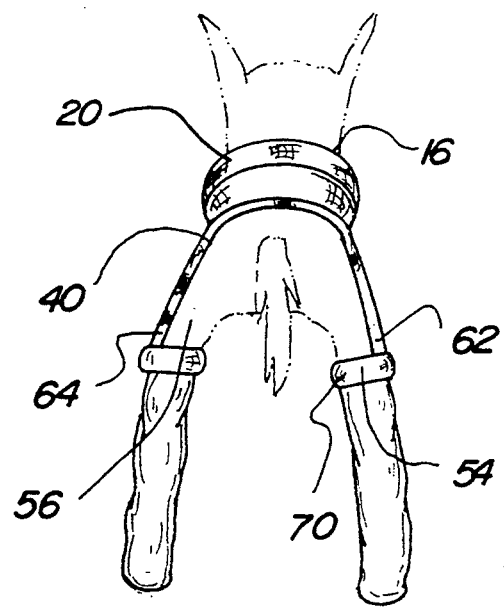
FIG. 2 is a rear perspective view showing a canine wearing the present invention.
Figure 3:
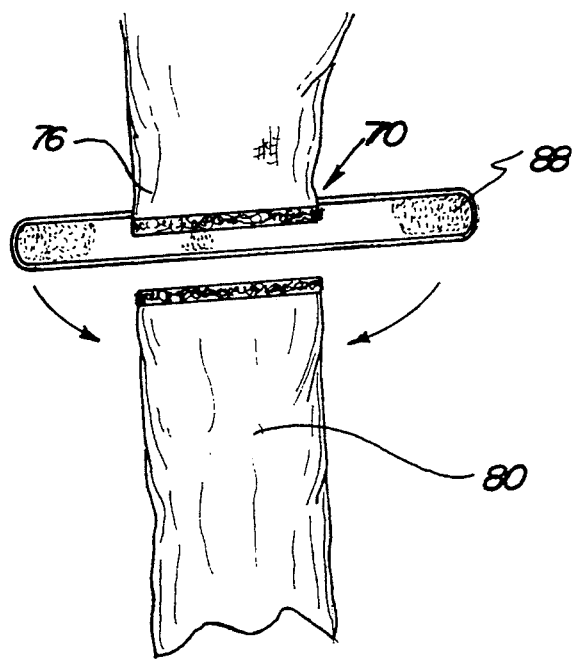
FIG. 3 is a partial perspective view showing the sleeve, legging and manner of attachment using the hook and loop fastener strap of the present invention.
Figure 4:
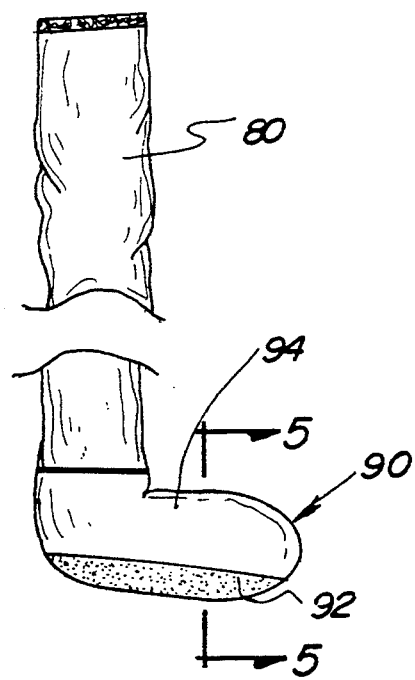
FIG. 4 is a partial perspective view of the legging and boot portion of the present invention.
Figure 5:
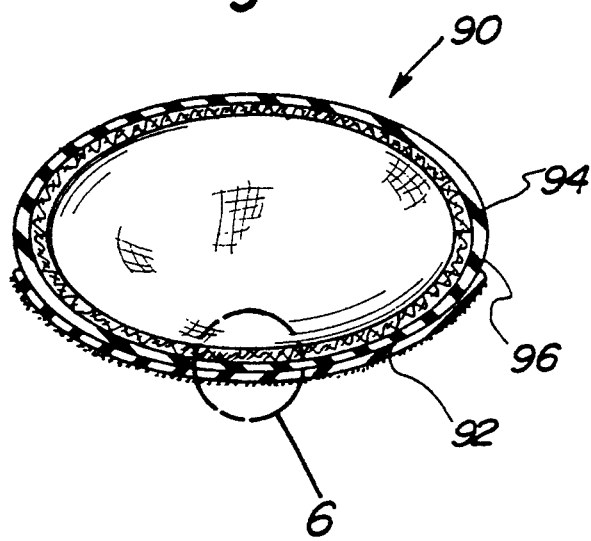
FIG. 5 is a partial cross-sectional view of the boot portion of the present invention taken along lines 5—5 of FIG. 4.
Figure 6:
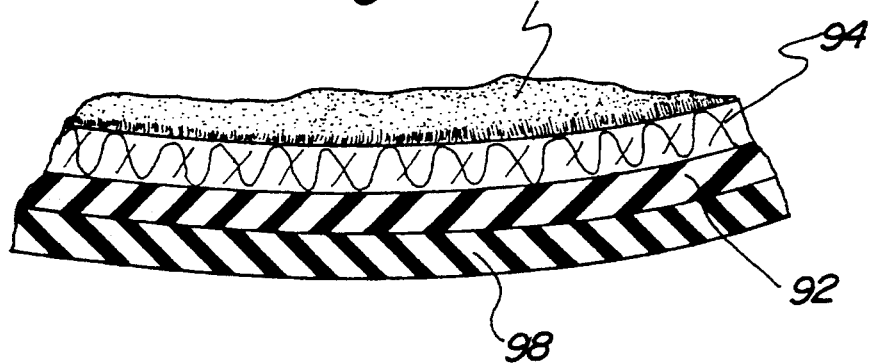
FIG. 6 is a partial cross-sectional view of detail 6 of the boot portion of the present invention taken from FIG. 5.

With reference now to the drawings, and in particular to FIG. 1 thereof, a new and improved dog sweater embodying the principles and concepts of the present invention and generally designated by the reference numeral 10 will be described.

From an overview standpoint, the dog sweater is adapted for use with a canine subject to flea infestation and the rigors of inclement climates. See FIG. 1.

More specifically, the dog sweater comprises a fabric torso portion 12. This has an exterior surface, and interior surface, a front end, a posterior end, a top portion, and a lower portion. The fabric torso portion covers the torso of a dog in inclement weather and provides flea protection as described later. The exterior surface of the fabric torso portion 12 is covered with moisture resistant fabric to repel precipitation and further help retain a dog's body heat. The interior surface of the fabric torso portion is covered with insulating fabric to retain the body heat of a dog.

A first aperture 16 extends through the front end of the fabric torso portion for accepting a dog's head. A neck collar 20 for protecting a dog's neck positioned about, and integral with, the first aperture.

Figure 7:
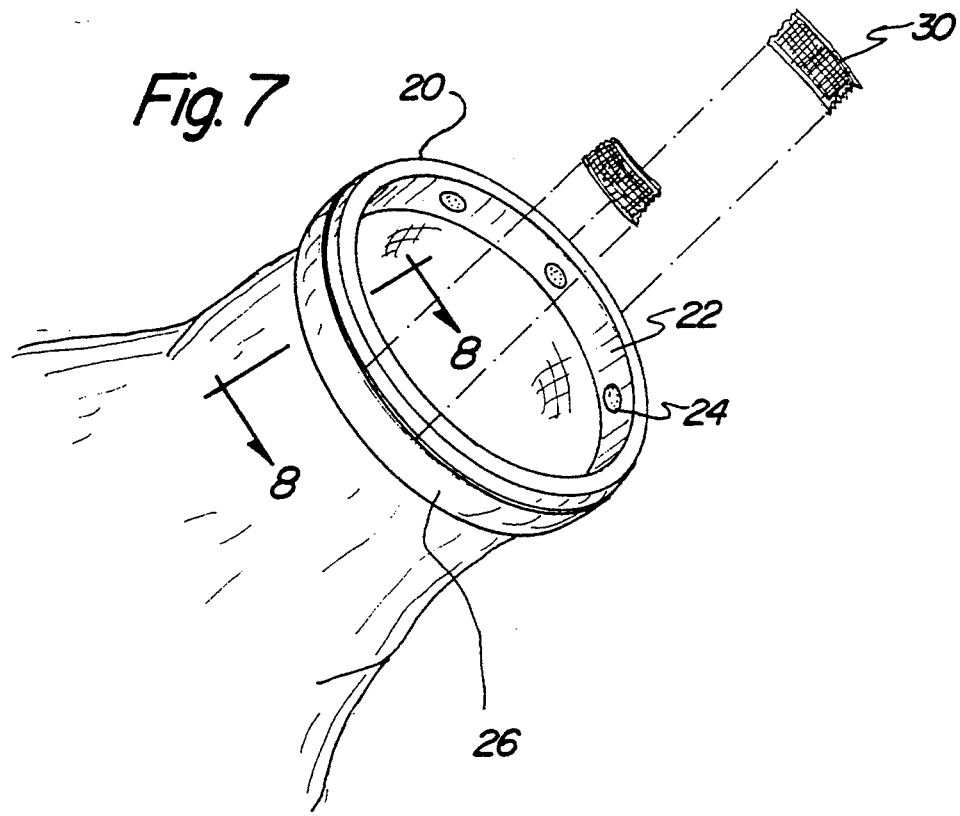
FIG. 7 is a partial perspective view of the neck collar of the present invention showing the interior ring, rolldown portion, apertures and flea repellent.
Figure 8:
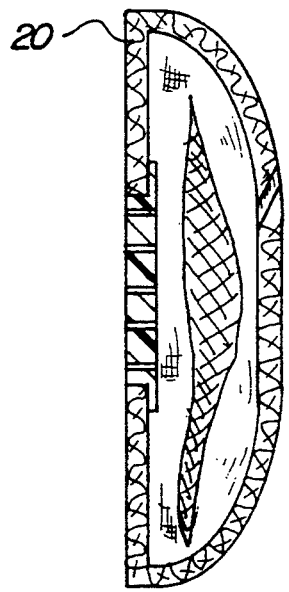
FIG. 8 is a partial cross-sectional view of the neck collar portion of the present invention taken along lines 8—8 of FIG. 7 showing flea repellent and aperture.

In an alternate embodiment, as shown in FIGS. 7 and 8, the neck collar 20 comprises a three part design. An interior ring 22 with a multiplicity of apertures 24 disperses flea repellent directly into a dog's fur, a rolldown protective exterior portion 26 retains and keeps dry a store of insect repellent, and a quantity of flea repellent enclosed mesh bags 30.

The flea repellent is housed in at least one fabric packet 30 contained between the interior ring and external portion for insect repellent dispersal when a dog moves or scratches, thus reducing the likelihood of insect infestation about the head of a dog.

A second opening 40 extends through the posterior end of the fabric torso portion for enabling a dog to eliminate bodily waste without soiling the fabric torso portion.

Two pair of similar apertures 50, 52, 54 and 56 at the front and posterior lower portions of the fabric torso portion receive the fore and rear limbs of a dog, respectively.

Sleeves 58, 60, 62 and 64 are integral with and extend downwardly from each aperture at the front and posterior lower portions of the fabric torso portion. Each sleeve has an upper end, a lower end, and fabric extending between for protecting the upper portions of the fore and rear limbs of a dog, respectively.

A leg collar 70 having a top end and a bottom end is positioned about, and integral with the bottom end of each sleeve at the front and posterior lower portion of the fabric torso. Each collar has a lower portion for receiving leggings 80.

A legging 80 having a top and bottom end, an exterior surface, and an interior surface is detachably coupled at the bottom end of each leg collar. The leggings comprise a moisture repellent exterior surface portion, and an insulated interior surface portion for protecting a dog's fore and rear limbs from the elements. The lower ends of the sleeves 76 include a strap 88 having a hook and loop fastener arrangement co-operable with the top end of the leggings. The strap may be wrapped about the leggings at the lower ends of the sleeves for detachably coupling to same and protecting the lower portions of a dog's limbs.

The bottom ends of the leggings further comprise a boot portion 90. This has a durable non-slip protective sole 92 having gripping members 98 extending therefrom, a moisture repellent exterior surface portion 94, and an insulated interior portion 96. The boot provides traction on uneven terrain, protects a dog's paws from sharp objects, and retains the animal's body heat, respectively.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved dog sweater comprising:
    a fabric torso portion for covering the body of a dog in inclement weather;
    a first aperture adapted to be positioned about a dog's neck with the first aperature circumferentially extending through the front end of the fabric torso portion for accepting a dog's head;
    a circumferential and generally rigid neck collar for protecting a dog's neck positioned about, and integral with, the first aperture in a closed loop configuration at the front portion of the fabric torso portion;
    a second opening extending through the posterior end of the fabric torso portion for enabling a dog to eliminate bodily waste without soiling the fabric torso portion;
    a pair of similar aperatures one each at the front and posterior lower portions of the fabric torso portion for receiving the fore and rear limbs of a dog, respectively;
    a sleeve integral with and extending downwardly from each aperature at the front and posterior lower portions of the fabric torso portion for protecting the upper portions of the fore and rear limbs of a dog, respetively;
    a leg collar positioned about, and integral with the bottom of each sleeve at the front and posterior lower portion of the fabric torso portion for receiving leggings; and
    a legging detachably coupled at the bottom end of each leg collar for protecting the lower portion of the fore and rear legs of a dog from the elements.

2. The new and improved dog sweater of claim 1 wherein the bottom ends of the sleeves further include a strap having a familiar hook and loop fastener arrangement which may be circumferentially wrapped about the upper portion of the leggings in a generally horizontal fashion for detachably coupling to same and protecting the lower portions of a dog's limbs.

3. The new and improved dog sweater of claim 1 wherein the bottom ends of the leggings receiving a dog's paws on the fore and rear limbs thereof further comprise a boot portion having a durable non-slip protective sole, a moisture repellant exterior surface portion, and an insulated interior portion for providing traction on uneven terrain, protecting a dog's paws from sharp objects, and retaining the animal's body heat, respectively.

4. A new and improved dog sweater comprising:
    a fabric torso portion for covering the body of a dog in inclement weather wherein the interior surface of the fabric torso portion is covered with insulating fabric to retain the body heat of a dog;
    a first aperture extending through the front end of the fabric torso portion for accepting a dog's head;
    a neck collar for protecting a dog's neck positioned about, and integral with, the first aperture at the front portion of the fabric torso portion wherein the neck collar comprises a three part design having an interior ring with a multiplicity of aperatures for dispersal of flea repellant directly into a dog's fur, a roll-down protective exterior portion for retaining and keeping dry a store of insect repellant, and a quantity of flea repellant housed in at least on fabric packet contained between the interior ring and external portion for insect repellant dispersal when a dog moves, thus reducing the likelihood of insect infestation about the head of a dog;
    a second opening extending through the posterior end of the fabric torso portion for enabling a dog to eliminate bodily waste without soiling the fabric torso portion;
    a pair of similar aperatures one each at the front and posterior lower portions of the fabric torso portion for receiving the fore and rear limbs of a dog, respectively;
    a sleeve integral with and extending downwardly from each aperature at the front and posterior lower portions of the fabric torso portion for protecting the upper portions of the fore and rear limbs of a dog, respetively;
    a leg collar positioned about, and integral with the bottom of each sleeve at the front and posterior lower portion of the fabric torso portion for receiving leggings; and
    a legging detachably coupled at the bottom end of each leg collar for protecting the lower portion of the fore and rear legs of a dog from the elements.

* * * * *

UNITED STATES PATENT AND TRADEMARK OFFICE
CERTIFICATE OF CORRECTION

PATENT NO.  : 5,359,963
DATED       : November 1, 1994
INVENTOR(S) : Ronald C. Jesse Sr., et. al.

It is certified that error appears in the above-indentified patent and that said Letters Patent is hereby corrected as shown below:

Title page, item [75] Inventor: should be --Ronald C. Jesse, Sr.--.

Signed and Sealed this

First Day of August, 1995

Attest:

BRUCE LEHMAN

Attesting Officer

Commissioner of Patents and Trademarks